(12) United States Patent
Wang et al.

(10) Patent No.: US 7,843,150 B2
(45) Date of Patent: Nov. 30, 2010

(54) POWER REGULATION FOR LED STRINGS

(75) Inventors: Michael Wang, Plano, TX (US); Xianwei Zeng, Shanghai (CN); Jingwei Xu, Shanghai (CN)

(73) Assignee: Texas Instruments Incorporated, Dallas, TX (US)

( * ) Notice: Subject to any disclaimer, the term of this patent is extended or adjusted under 35 U.S.C. 154(b) by 226 days.

(21) Appl. No.: 12/135,253

(22) Filed: Jun. 9, 2008

(65) Prior Publication Data
US 2008/0297067 A1    Dec. 4, 2008

Related U.S. Application Data

(63) Continuation of application No. PCT/CN2007/001748, filed on May 31, 2007.

(51) Int. Cl.
H05B 37/02    (2006.01)
(52) U.S. Cl. .................. 315/307; 315/185 R; 315/294
(58) Field of Classification Search ............. 315/185 R, 315/186, 192, 209 R, 291, 294, 307–308, 315/312
See application file for complete search history.

(56) References Cited

U.S. PATENT DOCUMENTS

| | | | |
|---|---|---|---|
| 7,307,614 B2 * | 12/2007 | Vinn | ........................... 345/102 |
| 2007/0139317 A1 * | 6/2007 | Martel et al. | ................... 345/82 |
| 2007/0229001 A1 * | 10/2007 | McIntosh et al. | ............ 315/307 |
| 2008/0116818 A1 * | 5/2008 | Shteynberg et al. | ......... 315/192 |
| 2008/0224625 A1 * | 9/2008 | Greenfeld | .................... 315/201 |

FOREIGN PATENT DOCUMENTS

| | | | |
|---|---|---|---|
| CN | 1745603 | A | 3/2006 |
| CN | 0909048 | A | 2/2007 |
| JP | 2000-347613 | A | 12/2000 |
| JP | 2002-8409 | A | 1/2002 |

* cited by examiner

Primary Examiner—Douglas W Owens
Assistant Examiner—Tung X Le
(74) Attorney, Agent, or Firm—William B. Kempler; Wade J. Brady, III; Frederick J. Telecky, Jr.

(57) ABSTRACT

One embodiment of the invention includes a power regulator system. The system comprises at least one current regulator configured to maintain a substantially constant current flow through each of at least one series connected light emitting diode (LED) string. The system also comprises a power converter configured to generate an output voltage to provide power to the at least one current regulator and the at least one series connected LED string. The system further comprises a voltage regulator configured to determine a voltage that provides power to the at least one current regulator and to adjust the output voltage based on the determined voltage to mitigate power loss due to excessive voltage provided to power the at least one current regulator.

17 Claims, 2 Drawing Sheets

POWER REGULATION FOR LED STRINGS

This is a continuation of PCT Application No. PCT/CN2007/001748, filed May 31, 2007, the entirety of which is incorporated herein by reference.

BACKGROUND

This invention relates to electronic circuits, and more specifically, to power regulation for light emitting diode LED strings.

There is an ever increasing demand for portable electronic devices to operate with increased efficiency and reduced power to accommodate the continuous reduction in size. Many times these devices are battery powered, and it is desirable to utilize as little power as possible to operate these devices so that the battery life is extended. One such example of power conservation in a portable electronic device is the use of light emitting diode (LED) strings instead of fluorescent bulbs for use in illumination of a backlight for a display, such as a monitor for a laptop computer. Typical LED systems draw minimal amounts of current, and thus consume significantly less power. As a result, battery life of the portable electronic device can be increased. In addition, among other advantages, LED systems can be smaller and more environmentally friendly, and can have a faster response with less electro-magnetic interference (EMI) emissions.

An LED may require a constant driving current to provide illumination. Thus, a typical LED string backlight system may include one or more current regulators to maintain a sufficient current flow to provide adequate illumination. As a result, an LED string backlight system may include a regulated supply voltage to provide the current flow-through the LEDs of the LED string backlight system. However, voltage that is provided above the necessary voltage to provide the current through each LED string consumes additional power, and is thus wasted. In addition, different LED strings may draw different quantities of current, and may thus require a different quantity of operating voltage. Furthermore, the brightness of the LED strings is typically controlled by pulsing the current through the LED strings at a given frequency. Therefore, regulating a supply voltage to the LED strings can result in loss of feedback, and thus an output ripple condition that can result in an undesirable audible humming noise based on rapid changes to the electrical charge on one or more output capacitors.

SUMMARY

One embodiment of the invention includes a power regulator system. The system comprises at least one current regulator configured to maintain a substantially constant current flow through each of at least one series connected light emitting diode (LED) string. The system also comprises a power converter configured to generate an output voltage to provide power to the at least one current regulator and the at least one series connected LED string. The system further comprises a voltage regulator configured to determine a voltage that provides power to the at least one current regulator and to adjust the output voltage based on the determined voltage to mitigate power loss due to excessive voltage provided to power the at least one current regulator.

Another embodiment of the invention includes a method for regulating power associated with at least one LED string. The method comprises generating an output voltage from a power converter for illuminating the at least one LED string and regulating a current flow through each of a respective LED string of the at least one LED string via an associated current regulator powered by the output voltage. The method also comprises periodically sampling at least one voltage across each associated current regulator and adjusting the output voltage based on the sampled at least one voltage across each associated current regulator relative to at least one threshold voltage.

Another embodiment of the invention includes a power regulator system. The system comprises means for generating an output voltage to provide power for illuminating at least one series connected LED string. The system also comprises at least one means for regulating a substantially constant current flow through each of the respective at least one series connected LED string and means for periodically sampling voltage associated with powering a respective at least one means for regulating the substantially constant current flow. The system further comprises means for adjusting the output voltage based on a comparison of the sampled voltages with at least one threshold voltage.

DETAILED DESCRIPTION

The invention relates to electronic circuits, and more specifically to power regulation for LED strings. A power converter provides an output voltage that is sufficient to provide current flow through one or more LED strings. The current flow through each of the LED strings is regulated by a respective plurality of current regulators, such that the current regulators maintain a substantially constant current through each of the LED strings. An output voltage regulator monitors the voltage across each of the current regulators at a sampling rate that is defined by an on-time (e.g., duty cycle) of a pulse-width modulated enable signal and/or a preset fixed value. The enable signal can be implemented to enable current flow through the LED strings via the current regulators. If any one of the voltages across the current regulators is below a minimum threshold, the output voltage can be increased by a predetermined increment. If all of the voltages across the current regulators are greater than a maximum threshold, the output voltage can be decreased by a predetermined increment. The power converter thus adjusts the output voltage to minimize power loss based on excessive current regulator voltage, and can substantially mitigate output ripple that can result in an undesirable audible humming noise.

Figure 1:
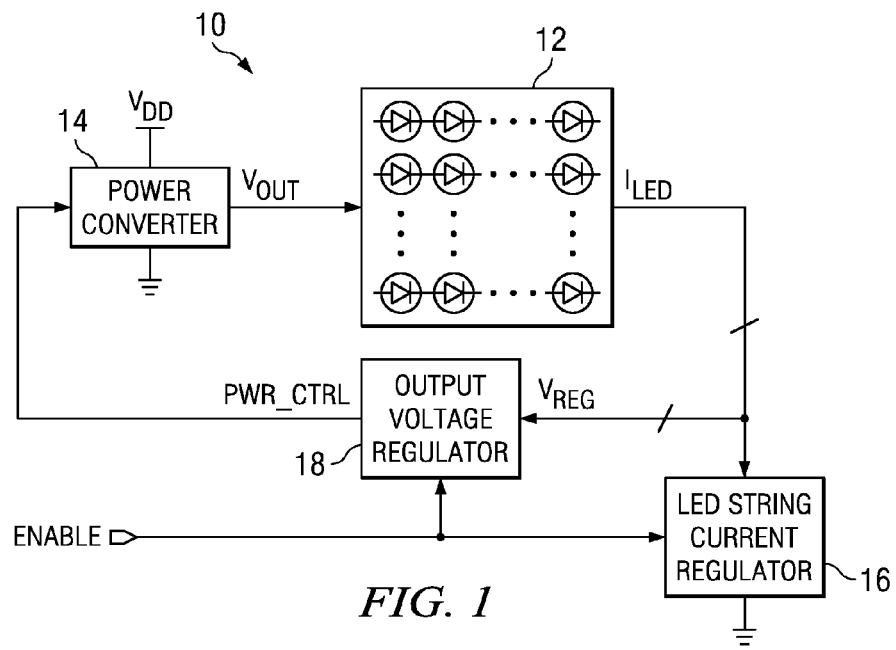
FIG. 1 illustrates an example of a power regulator system in accordance with an aspect of the invention.

FIG. 1 illustrates an example of a power regulator system 10 in accordance with an aspect of the invention. The power regulator system 10 can be implemented to regulate power associated with one or more LED strings 12. The LED strings are configured in parallel relative to each other, with each of the LED strings 12 being configured as a plurality of LEDs that are connected in series. The series connected LED strings 12 can be configured to provide illumination for a backlight of a display on a portable electronic device, such as a laptop computer. The LED strings can be white LEDs (WLEDs), or can be colored LEDs, such as red, green, or blue LEDs.

The power regulator system 10 includes a power converter 14 configured to generate an output voltage $V_{OUT}$. The power converter 14 can be configured as a buck converter, a boost converter, or a buck/boost converter. As an example, the power converter 14 can be configured as a switched-mode power supply (SMPS), such that an inductor is alternately coupled between a positive supply voltage $V_{DD}$ and a negative supply voltage, demonstrated in the example of FIG. 1 as ground. The output voltage $V_{OUT}$ is provided to the LED strings 12.

The power regulator system 10 also includes an LED string current regulator 16 interconnecting the LED strings 12 and ground. The LED string current regulator 16 is configured to maintain a substantially constant supply current through each of the LED strings 12, demonstrated in the example of FIG. 1 as $I_{LED}$. In the example of FIG. 1, it is to be understood that the supply current $I_{LED}$ is distributed across each of the parallel LED strings 12, such that the supply current $I_{LED}$ can be representative of multiple separate supply currents. As an example, the LED strings 12 can be configured as WLED strings, such that the currents of the supply current $I_{LED}$ through each of the LED strings 12 can be substantially equal to achieve substantially uniform brightness. As another example, LED strings of a different color may draw different amounts of supply current relative to each other to achieve substantially uniform brightness. As such, the currents of the supply current $I_{LED}$ through each of the LED strings 12 can be different relative to each other. The LED string current regulator 16 can include a respective plurality of current sinks to maintain the substantially constant supply current $I_{LED}$. As an example, the current sources can include current mirrors, or can include variable resistor current sources.

The LED string current regulator 16 receives an enable signal ENABLE as an input. The LED string current regulator 16 receives the enable signal ENABLE to control the brightness of the LED strings 12. As an example, the enable signal ENABLE can be a pulse-width modulated signal having a frequency from about 200 Hz to about 1 kHz. The LED string current regulator 16 can be configured to interrupt the supply current $I_{LED}$ from flowing through the LED strings 12 based on the duty-cycle of the enable signal ENABLE. As a result, the brightness of the LED strings 12 can be controlled based on adjusting the duty-cycle of the enable signal ENABLE to provide longer or shorter durations of current flow to the LED strings 12.

As described above, the LED string current regulator 16 is configured to maintain a substantially constant supply current $I_{LED}$ to each of the LED strings 12. The supply current $I_{LED}$ can thus be set to a substantially constant magnitude for each of the individual LED strings 12, such that the output voltage $V_{OUT}$ provided to the LED strings 12 can be substantially variable without changing the amount of supply current $I_{LED}$ flowing through the LED strings 12. However, due to temperature and/or process variations, the voltage across each of the LED strings 12 can vary under different conditions and relative to each other, regardless of the supply current $I_{LED}$. Therefore, any amount of voltage potential of the output voltage $V_{OUT}$ that is greater than that necessary to provide the substantially constant supply current $I_{LED}$ results in the unnecessary consumption of power. As a result, power is wasted for values of the output voltage $V_{OUT}$ greater than that necessary for the LED string current regulators 16 to provide the substantially constant supply current $I_{LED}$.

The power regulator system 10 includes an output voltage regulator 18 that is configured to monitor current regulator voltages $V_{REG}$ across the current regulators in the LED string current regulator 16. In the example of FIG. 1, the output voltage regulator 18 monitors the current regulator voltages $V_{REG}$ of each of the signals providing the supply current $I_{LED}$ through each of the respective LED strings 12. As such, in the example of FIG. 1, the current regulator voltages $V_{REG}$ is representative of each of the separate voltages across each of the respective current regulators in the LED string current regulator 16. The measured voltage potential of the current regulator voltage $V_{REG}$ is relative to a negative supply voltage, demonstrated in the example of FIG. 1 as ground. Therefore, the output voltage regulator 18 can determine the current regulator voltages $V_{REG}$ directly relative to ground, such that the current regulator voltages $V_{REG}$ in the LED string current regulator 16 can be determined as acceptable or excessive.

Because the LED string current regulator 16 periodically interrupts the supply current $I_{LED}$ to the LED strings 12 based on the enable signal ENABLE, the current regulator voltages $V_{REG}$ are likewise periodically interrupted. As a result, the current regulator voltages $V_{REG}$ cannot be continuously provided as a feedback signal for the output voltage regulator 18. Accordingly, the output voltage regulator 18 can sample the current regulator voltages $V_{REG}$ of each of the LED strings 12 based on a duty-cycle of the enable signal ENABLE. In the example of FIG. 1, the output voltage regulator 18 receives the enable signal ENABLE as an input to demonstrate the sampling of the current regulator voltages $V_{REG}$, such as at a time immediately preceding the interruption of the supply current $I_{LED}$ from the LED strings 12.

For example, the LED string current regulator 16 can include delay elements configured to delay the interruption of the supply current $I_{LED}$ from the LED strings 12. Therefore, the output voltage regulator 18 can sample the current regulator voltages $V_{REG}$ just prior to the interruption of the supply current $I_{LED}$ from the LED strings 12. As another example, the output voltage regulator 18 can sample the current regulator voltages $V_{REG}$ using a separate signal that is phase-shifted (i.e., 270° or more) from the enable signal ENABLE. As another example, the output voltage regulator 18 can be configured to sample the current regulator voltages $V_{REG}$ at a fixed interval, or based on a combination of a fixed interval and the duty-cycle of the enable signal ENABLE. For example, the output voltage regulator 18 can sample the current regulator voltages $V_{REG}$ at a fixed interval (e.g., every 250 µS), unless the duty-cycle of the enable signal ENABLE is less than the fixed interval, at which the output voltage regulator 18 samples the current regulator voltages $V_{REG}$ at a time just prior to the deactivation of the LED strings 12. Furthermore, as yet another example, the output voltage regulator 18 may not actually sample the current regulator voltages $V_{REG}$, but may instead simply compare the current regulator voltages $V_{REG}$ with the at least one threshold during the entirety of the time that the enable signal ENABLE is asserted (i.e., logic high) to provide the supply current $I_{LED}$ to the LED strings 12.

To minimize the current regulator voltages $V_{REG}$ across the LED string current regulator 16, the output voltage regulator 18 can compare the current regulator voltages $V_{REG}$ with at least one threshold voltage. As an example, the at least one threshold can include a maximum threshold voltage and a minimum threshold voltage. The output voltage regulator 18 provides an output signal PWR_CTRL to command the power converter 14 to adjust the output voltage $V_{OUT}$ based on the comparison of the individual current regulator voltages $V_{REG}$ with the at least one threshold voltage. As an example, the output voltage regulator 18 can increase or decrease the output voltage $V_{OUT}$ by a predetermined increment (e.g., 100 mV) after each sample of the current regulator voltages $V_{REG}$ to generate an adjusted output voltage based on the comparison of the current regulator voltages $V_{REG}$ with the at least one threshold voltage. As an example, the signal PWR_CTRL can provide an output voltage control signal to the power converter 14 as an error voltage, such that the power converter 14 can set the output voltage $V_{OUT}$ substantially equal to the adjusted output voltage.

By setting the output voltage $V_{OUT}$ based on the sampled current regulator voltages $V_{REG}$, the power regulator system 10 can minimize the voltage across each of the current regulators in the LED string current regulator 16. As a result, the current regulators in the LED string current regulator 16 consume less power, and thus power is conserved in the power regulator system 10. Accordingly, the power regulator system 10 is configured to illuminate the LED strings 12 more efficiently. Furthermore, by sampling the LED voltages $V_{LED}$ to generate the regulator voltages $V_{REG}$, the output voltage $V_{OUT}$ can be regulated even while the current to the LED strings 12 is interrupted to set the brightness of the LED strings 12. As a result, the output voltage $V_{OUT}$ can remain substantially constant during the on-time and the off-time of the enable signal ENABLE to control the brightness of the LED strings 12. Thus, an output ripple caused by rapid changes of the output voltage $V_{OUT}$, such as resulting in an undesirable audible humming noise of an output capacitor, can be substantially mitigated.

It is to be understood that the power regulator system 10 is not intended to be limited by the example of FIG. 1. For example, the discussion of the example of FIG. 1 pertains to a plurality of LED strings 12. However, the example of FIG. 1 can be configured to regulate power to a single LED string, or any of a variety of other systems in which a substantially constant current is provided to a load. In addition, the LED string current regulator 16 need not be configured as a plurality of current sinks, but can instead be configured as a plurality of current sources, as demonstrated below in the example of FIG. 3. Therefore, the power regulator system 10 can be configured in any of a variety of ways.

Figure 2:
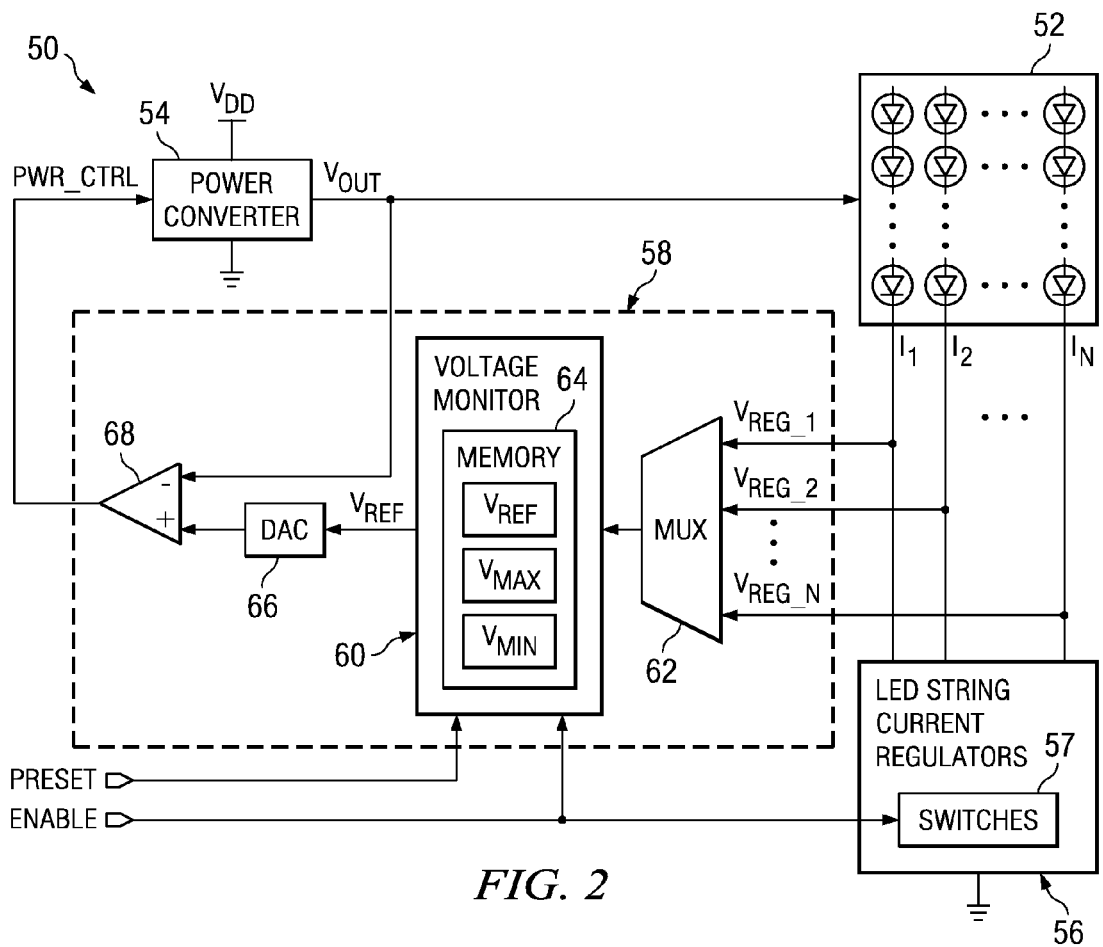
FIG. 2 illustrates another example of a power regulator system in accordance with an aspect of the invention.

FIG. 2 illustrates another example of a power regulator system 50 in accordance with an aspect of the invention. The power regulator system 50 can be implemented to regulate power associated with one or more LED strings 52. Similar to as described above in the example of FIG. 1, the LED strings are configured in parallel relative to each other, with each of the LED strings 52 being configured as a plurality of LEDs that are connected in series. The LED strings can be WLEDs, can be colored LEDs, such as red, green, or blue LEDs, or can be a mixture of colors on different ones or the same LED strings.

The power regulator system 50 includes a power converter 54 configured to generate an output voltage $V_{OUT}$. The power converter 54 can be configured as a buck converter, a boost converter, or a buck/boost converter SMPS. The power converter 54 can generate the output voltage $V_{OUT}$ from a DC positive supply voltage $V_{DD}$, such as provided from a battery or a power adaptor. The output voltage $V_{OUT}$ is provided to the LED strings 52.

The power regulator system 10 also includes LED string current regulators 56 interconnecting the LED strings 52 and ground. The LED string current regulators 56 are configured to maintain a substantially constant supply current through each of the LED strings 52. In the example of FIG. 2, the supply current is demonstrated as separate current signals $I_1$ through $I_N$, where N is a positive integer. As an example, the LED strings 52 can be WLED strings, such that the supply currents $I_1$ through $I_N$ could each be substantially equal to achieve substantially uniform brightness. As another example, the supply currents $I_1$ through $I_N$ can be provided to a combination of red, blue, and/or green LED strings, such that the supply currents $I_1$ through $I_N$ can vary relative to each other to achieve substantially uniform brightness. The LED string current regulators 56 can include a respective plurality of current sinks to maintain the substantially constant supply currents $I_1$ through $I_N$. As an example, the current sinks can include current mirrors, or can include variable resistor current sources.

The LED string current regulators 56 receive an enable signal ENABLE as an input. The LED string current regulators 56 can be configured to control the brightness of the LED strings 52 based on the enable signal ENABLE. The LED string current regulators 56 can include switches 57, and the enable signal ENABLE can be a pulse-width modulated signal configured to control the activation state of the switches 57. As such, the enable signal ENABLE can control the activation of the 57 switches based on the duty-cycle. The switches 57 can be configured in series with the respective LED string current regulators 56, such that the supply currents $I_1$ through $I_N$ to the LED strings 52 are alternately switched on and off based on the duty-cycle. As a result, the brightness of the LED strings 52 can be controlled based on adjusting the duty-cycle of the enable signal ENABLE to provide longer or shorter durations of current flow to the LED strings 52. In addition, the switches 57 can also function as a portion of the LED string current regulators 56, such that the switches 57 are configured as transistors operating in a linear mode to regulate the respective supply currents $I_1$ through $I_N$ and to be disconnected to interrupt the flow of the respective supply currents $I_1$ through $I_N$ to the LED strings 52.

Similar to as described above in the example of FIG. 1, process and/or temperature variations can result in the voltage across each of the LED strings 52 varying relative to each other based on operating conditions, regardless of the respective supply currents $I_1$ through $I_N$. Therefore, the output voltage regulator 58 includes a voltage monitor 60. In the example of FIG. 2, the voltage monitor 60 is configured to monitor the current regulator voltages $V_{REG\_1}$ through $V_{REG\_N}$ of the signals corresponding to the respective supply currents $I_1$ through $I_N$. As such, in the example of FIG. 2, the current regulator voltages $V_{REG\_1}$ through $V_{REG\_N}$ are representative of each of the separate voltages across the LED string current regulators 56. The current regulator voltages $V_{REG\_1}$ through $V_{REG\_N}$ are input to the voltage monitor 60 via a multiplexer (MUX) 62. For example, the voltage monitor 60 can sample the current regulator voltages $V_{REG\_1}$ through $V_{REG\_N}$ individually and sequentially based on the enable signal ENABLE. Alternatively, the output voltage regulator 58 may not include the MUX 62, such that the voltage monitor 60 samples the current regulator voltages $V_{REG\_1}$ through $V_{REG\_N}$ substantially concurrently, such as via a respective plurality of comparators.

In the example of FIG. 2, the measured voltage potential of the current regulator voltages $V_{REG\_1}$ through $V_{REG\_N}$ is relative to a negative supply voltage, demonstrated in the example of FIG. 2 as ground. As such, the current regulator voltages $V_{REG\_1}$ through $V_{REG\_N}$ can indicate excessive voltage potentials that result in inefficient power consumption in the illumination of the LED strings 52. Because the switches 57 periodically interrupt the supply current $I_1$ through $I_N$ to the LED strings 52 based on the enable signal ENABLE, the current regulator voltages $V_{REG\_1}$ through $V_{REG\_N}$ are likewise periodically interrupted. As a result, the current regulator voltages $V_{REG\_1}$ through $V_{REG\_N}$ cannot be continuously monitored by the voltage monitor 60. Accordingly, the voltage monitor 60 can sample the current regulator voltages $V_{REG\_1}$ through $V_{REG\_N}$ of each of the LED strings 52 based on a duty-cycle of the enable signal ENABLE. In the example of FIG. 2, the voltage monitor 60 receives the enable signal ENABLE as an input to demonstrate the sampling of the current regulator voltages $V_{REG\_1}$ through $V_{REG\_N}$, such as at a time immediately preceding the deactivation of the switches 57 to decouple the supply current $I_1$ through $I_N$ from the LED strings 52.

For example, the LED string current regulators 56 can include delay elements configured to delay the deactivation of the switches 57 to decouple the supply current $I_1$ through $I_N$ from the LED strings 52. Therefore, the voltage monitor 60 can sample the current regulator voltages $V_{REG\_1}$ through $V_{REG\_N}$ just prior to the deactivation of the switches in the LED string current regulators 56. As another example, the voltage monitor 60 can sample the current regulator voltages $V_{REG\_1}$ through $V_{REG\_N}$ using a separate signal that is phase-shifted (i.e., 270° or more) from the enable signal ENABLE. Furthermore, similar to as described above in the example of FIG. 1, the voltage monitor 60 can be configured to sample the current regulator voltages $V_{REG\_1}$ through $V_{REG\_N}$ at a fixed interval, or at a combination of a fixed interval and based on the duty-cycle of the enable signal ENABLE.

The voltage monitor 60 can receive a signal PRESET that includes programmable parameters as an input. As an example, the signal PRESET can include a maximum threshold voltage $V_{MAX}$, a minimum threshold voltage $V_{MIN}$, and a reference voltage $V_{REF}$, which can be stored in a memory 64 in the voltage monitor 60. To minimize the regulator voltages $V_{REG\_1}$ through $V_{REG\_N}$ across the LED string current regulators 56, the voltage monitor 60 can compare the current regulator voltages $V_{REG\_1}$ through $V_{REG\_N}$ with the maximum threshold voltage $V_{MAX}$ and the minimum threshold voltage $V_{MIN}$ at each sample defined by the duty-cycle of the enable signal ENABLE, or based on a fixed interval (e.g., 250 µS) when the enable signal ENABLE is asserted. The minimum threshold voltage $V_{MIN}$ can be set to a potential that is the minimum operating voltage necessary for the LED string current regulators 56 to maintain the substantially constant current flow $I_1$ through $I_N$ through the LED strings 52. The maximum threshold voltage $V_{MAX}$ can likewise be set to a potential that is slightly greater than a minimum operating voltage necessary for the LED string current regulators 56 to maintain the substantially constant current flow $I_1$ through $I_N$, and may thus define a maximum efficient operating voltage. As a result, the voltage monitor 60 can determine at each sample if each of the current regulator voltages $V_{REG\_1}$ through $V_{REG\_N}$ are within a range of acceptable operating voltages, as defined by the threshold voltages $V_{MAX}$ and $V_{MIN}$.

The reference voltage $V_{REF}$ can be a predetermined desired voltage potential corresponding to the output voltage $V_{OUT}$. Thus, the voltage monitor 60 can adjust the reference voltage $V_{REF}$ in response to the comparison of the current regulator voltages $V_{REG\_1}$ through $V_{REG\_N}$ with the threshold voltages $V_{MAX}$ and $V_{MIN}$. The voltage monitor 60 may adjust the reference voltage $V_{REF}$ by adding or subtracting a predetermined increment (e.g., 100 mV) in response to the comparison at each sample. The reference voltage $V_{REF}$ is provided to a digital-to-analog converter (DAC) 66 configured to convert the reference voltage $V_{REF}$ to an analog form. The output voltage regulator 58 includes an error amplifier 68 which receives the analog reference voltage $V_{REF}$ at a non-inverting input and the output voltage $V_{OUT}$ at an inverting input. Thus, the error amplifier 68 is configured to compare the reference voltage $V_{REF}$ and the output voltage $V_{OUT}$ to provide a power control signal PWR_CTRL that is provided to the power converter 54. As a result, the power converter 54 can set the output voltage $V_{OUT}$ substantially equal to the reference voltage $V_{REF}$ based on the power control signal PWR_CTRL. For example, the power control signal PWR_CTRL can include an error voltage, such that the power converter 54 adjusts the output voltage $V_{OUT}$ based on the error voltage.

As an example, the voltage monitor 60 may first compare each of the current regulator voltages $V_{REG\_1}$ through $V_{REG\_N}$ with the minimum threshold voltage $V_{MIN}$. If any of the current regulator voltages $V_{REG\_1}$ through $V_{REG\_N}$ are less than the minimum threshold voltage $V_{MIN}$, then the output voltage $V_{OUT}$ is not sufficient to provide the minimum operating voltage necessary for the LED string current regulators 56 to maintain the substantially constant current flow $I_1$ through $I_N$. Thus, the voltage monitor 60 can increase the reference voltage $V_{REF}$ by the predetermined increment in response to the comparison. If all of the current regulator voltages $V_{REG\_1}$ through $V_{REG\_N}$ are greater than the minimum threshold voltage $V_{MIN}$, then the voltage monitor 60 can compare each of the current regulator voltages $V_{REG\_1}$ through $V_{REG\_N}$ with the maximum threshold voltage $V_{MAX}$. If all of the current regulator voltages $V_{REG\_1}$ through $V_{REG\_N}$ are greater than the maximum threshold voltage $V_{MAX}$, then the output voltage $V_{OUT}$ is greater than necessary, such that power is wasted by the LED string current regulators 56. Thus, the voltage monitor 60 can decrease the reference voltage $V_{REF}$ by the predetermined increment in response to the comparison. If all of the current regulator voltages $V_{REG\_1}$ through $V_{REG\_N}$ are greater than the minimum threshold voltage $V_{MIN}$, and one or more of the current regulator voltages $V_{REG\_1}$ through $V_{REG\_N}$ are less than or equal to the maximum threshold voltage $V_{MAX}$, then the current regulator voltages $V_{REG\_1}$ through $V_{REG\_N}$ are within the acceptable operating range. Thus, the voltage monitor 60 makes no adjustment to the reference voltage $V_{REF}$.

By setting the output voltage $V_{OUT}$ based on the sampled regulator voltages $V_{REG\_1}$ through $V_{REG\_N}$, the power regulator system 50 can minimize the voltage of each of the current regulators in the LED string current regulators 56. As a result, the LED string current regulators 56 consume less power, and thus power is conserved in the power regulator system 50. Accordingly, the power regulator system 50 is configured to illuminate the LED strings 52 more efficiently. Furthermore, by sampling the current regulator voltages $V_{REG\_1}$ through $V_{REG\_N}$ to generate the regulator voltages $V_{REG\_1}$ through $V_{REG\_N}$, the output voltage $V_{OUT}$ can be regulated even while the current to the LED strings 52 is interrupted by the switches 57 to set the brightness of the LED strings 52. Furthermore, by sampling the current regulator voltages $V_{REG\_1}$ through $V_{REG\_N}$, the output voltage $V_{OUT}$ can be regulated even while the currents $I_1$ through $I_N$ to the LED strings 52 are interrupted to set the brightness of the LED strings 52. As a result, the output voltage $V_{OUT}$ can remain substantially constant during the on-time and the off-time of the enable signal ENABLE to control the brightness of the LED strings 52. Thus, an output ripple caused by rapid changes of the output voltage $V_{OUT}$, such as resulting in an undesirable audible humming noise of an output capacitor, can be substantially mitigated.

It is to be understood that the power regulator system 50 is not intended to be limited by the example of FIG. 2. For example, the discussion of the example of FIG. 2 pertains to a plurality of LED strings 52. However, the example of FIG. 2 can be configured to regulate power to a single LED string, or any of a variety of other systems in which a substantially constant current is provided to a load. In addition, the LED string current regulators 56 need not be configured as current sinks, but can instead be configured as current sources, as described in greater detail in the example of FIG. 3. Furthermore, the output voltage regulator 58 could be configured differently. As an example, the output voltage regulator 58 could be provided with the output voltage $V_{OUT}$ directly instead of the reference voltage $V_{REF}$, or could implement a summer to add or subtract the predetermined increments from the reference voltage $V_{REF}$ instead of providing the reference voltage $V_{REF}$ and the output voltage $V_{OUT}$ to the error amplifier 68 to generate the power control signal PWR_CTRL. Furthermore, the output voltage $V_{OUT}$ can be proportionally scaled down before being provided to the error amplifier 68. Therefore, the power regulator system 50 can be configured in any of a variety of ways.

Figure 3:
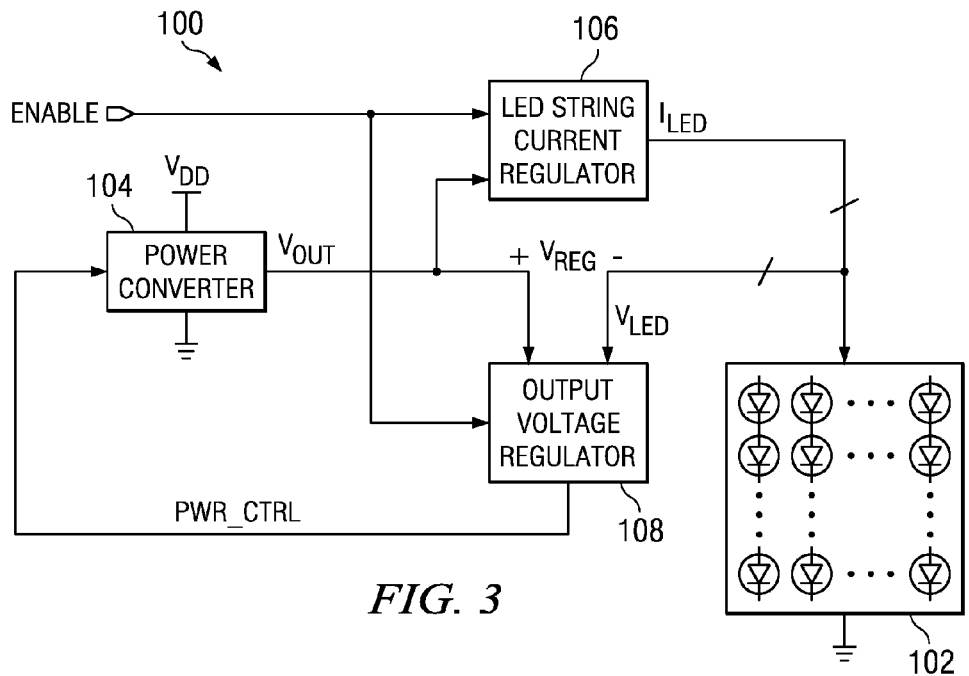
FIG. 3 illustrates yet another example of a power regulator system in accordance with an aspect of the invention

FIG. 3 illustrates an example of a power regulator system 100 in accordance with an aspect of the invention. The power regulator system 100 can be implemented to regulate power associated with one or more LED strings 102. Similar to as described above regarding the example of FIG. 1, the power regulator system 100 includes an LED string current regulator 106 and an output voltage regulator 108. However, in the example of FIG. 3, the LED string current regulator 106 can include a respective plurality of current sources to maintain the substantially constant supply current ILED. As a result, the output voltage $V_{OUT}$ is provided to the LED string current regulator 106 and an output voltage regulator 108.

In the example of FIG. 3, the output voltage regulator 108 is configured to monitor an LED voltage $V_{LED}$ associated with the LED strings 102, such as based on sampling LED voltage $V_{LED}$ based on a predetermined interval and/or the duty-cycle of the enable signal ENABLE, similar to as described above regarding the example of FIGS. 1 and 2. The measured voltage potential of the LED voltage $V_{LED}$ of each of the LED strings 102 is relative to a negative supply voltage, demonstrated in the example of FIG. 3 as ground. In addition, the output voltage regulator 108 receives the output voltage $V_{OUT}$ as an input. Therefore, the output voltage regulator 108 can determine current regulator voltages $V_{REG}$ across each of the current regulators in the LED string current regulator 106 between the output voltage $V_{OUT}$ and each of the respective LED voltages $V_{LED}$.

For example, the output voltage regulator 108 can subtract the LED voltages $V_{LED}$ from the output voltage $V_{OUT}$ to determine the current regulator voltage $V_{REG}$. Therefore, the current regulator voltages $V_{REG}$ in the LED string current regulator 106 can be determined to be acceptable, insufficient, or excessive. Accordingly, the output voltage monitor 108 can provide the output signal PWR_CTRL to command the power converter 104 to adjust the output voltage $V_{OUT}$ based on the comparison of the individual regulator voltages $V_{REG}$ with at least one threshold voltage. As a result, the current regulator voltages $V_{REG}$ across each of the current regulators in the LED string current regulator 106 can be minimized, such that the current regulators in the LED string current regulator 106 consume less power. Accordingly, the power regulator system 100 is configured to illuminate the LED strings 102 more efficiently, and output ripple caused by rapid changes of the output voltage $V_{OUT}$, such as resulting in an undesirable audible humming noise of an output capacitor, can be substantially mitigated.

It is to be understood that the power regulator system 100 is not intended to be limited by the example of FIG. 3. For example, similar to as described above in the example of FIGS. 1 and 2, the power regulator system 100 can be configured to regulate power to a single LED string, or any of a variety of other systems in which a substantially constant current is provided to a load. Therefore, the power regulator system 100 can be configured in any of a variety of ways.

Figure 4:
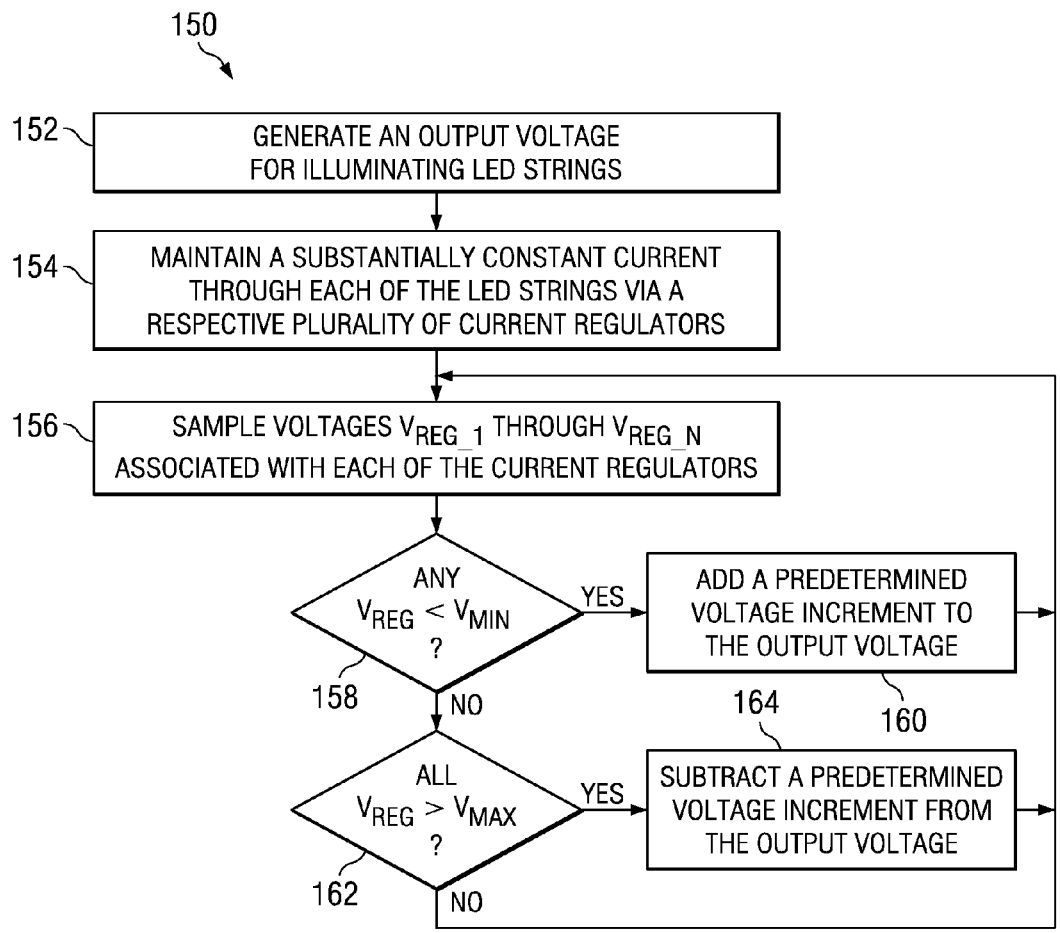
FIG. 4 illustrates an example of a method for regulating voltage for LED strings in accordance with an aspect of the invention.

In view of the foregoing structural and functional features described above, certain methods will be better appreciated with reference to FIG. 4. It is to be understood and appreciated that the illustrated actions, in other embodiments, may occur in different orders and/or concurrently with other actions. Moreover, not all illustrated features may be required to implement a method.

FIG. 4 illustrates an example of a method 150 for regulating voltage for LED strings in accordance with an aspect of the invention. At 152, an output voltage is generated for illuminating the LED strings. The output voltage can be generated from an SMPS, such as a buck converter, boost converter, or a buck/boost converter. At 154, a substantially constant current flow is maintained through each of the LED strings via a respective plurality of current regulators based on the output voltage. The plurality of current regulators can be configured as current sources or current sinks. At 156, voltages $V_{REG\_1}$ through $V_{REG\_N}$ across each of the respective current regulators are sampled. The sampling can be based on a duty-cycle of an enable signal configured to control a brightness of the LED strings, or based on a predetermined interval.

At 158, the voltages $V_{REG}$ are compared to a minimum threshold $V_{MIN}$. If any of the voltages $V_{REG}$ are less than the minimum threshold $V_{MIN}$, the method proceeds to 160. If all of the voltages $V_{REG}$ are greater than or equal to the minimum threshold $V_{MIN}$, the method proceeds to 162. At 160, a digital voltage increment is added to the output voltage, and the method returns to 156. At 162, the voltages $V_{REG}$ are compared to a maximum threshold $V_{MAX}$. If all of the voltages $V_{REG}$ are greater than the maximum threshold $V_{MAX}$, the method proceeds to 164. If one or more of the voltages $V_{REG}$ are less than or equal to the maximum threshold $V_{MAX}$, the method returns to 156. At 164, a digital voltage increment is subtracted from the output voltage, and the method returns to 156.

What have been described above are examples of the invention. It is, of course, not possible to describe every conceivable combination of components or methodologies for purposes of describing the invention, but one of ordinary skill in the art will recognize that many further combinations and permutations of the invention are possible. Accordingly, the invention is intended to embrace all such alterations, modifications, and variations.

What is claimed is:

1. A power regulator system comprising:
    at least one current regulator configured to maintain a substantially constant current flow through each of at least one series connected light emitting diode (LED) string;
    a power converter configured to generate an output voltage to provide power to the at least one current regulator and the at least one series connected LED string; and
    a voltage regulator configured to determine a voltage that provides power to the at least one current regulator and to adjust the output voltage to maintain a substantially constant output voltage based on the determined voltage to mitigate power loss due to excessive voltage provided to power the at least one current regulator, wherein the voltage regulator comprises a voltage monitor, a digital-to-analog converter (DAC), and an error amplifier, the voltage monitor being configured to one of increase and decrease a reference voltage by a predetermined increment, the DAC being configured to convert the reference voltage to an analog reference voltage, and the error amplifier being configured to compare the analog reference voltage with the output voltage and to output a command signal, the command signal is being configured as an error voltage for adjusting the output voltage of the power converter and wherein the output voltage is one of increased by a predetermined increment if the determined voltage of each of the at least one current regulator is below a minimum threshold and decreased by a predetermined increment if each determined voltage of each of the at least one current regulator is above a maximum threshold.

2. The system of claim 1, wherein the voltage regulator is configured to compare the determined voltage with a lower first threshold voltage and a higher second threshold voltage.

3. The system of claim 2, wherein a command signal is provided by the voltage regulator that commands the power converter to increase the output voltage upon the determined voltage being less than the first threshold voltage.

4. The system of claim 2, wherein a command signal provided by the voltage regulator that commands the power converter to decrease the output voltage upon the determined voltage being greater than the second threshold voltage.

5. The system of claim 1, wherein the at least one current regulator comprises at least one respective switch responsive to an enable signal configured to control a brightness of the respective at least one series connected LED string based on a duty-cycle of the enable signal.

6. The system of claim 5, wherein the voltage regulator is configured to periodically sample the voltage that provides power to the at least one current regulator based on at least one of an on-time of the enable signal and a predetermined interval.

7. The system of claim 5, wherein the voltage regulator is configured to monitor the voltage that provides power to the at least one current regulator continuously upon the enable signal being logic high.

8. An electronic device having an LED display, the electronic device comprising the system of claim 1.

9. A method for regulating power associated with at least one light emitting diode (LED) string, the method comprising:

generating an output voltage from a power converter that provides power for illuminating the at least one LED string;

regulating a current flow through each of a respective LED string of the at least one LED string via an associated current regulator powered by the output voltage;

periodically sampling at least one voltage across each associated current regulator; and adjusting the output voltage based on the sampled at least one voltage across each associated current regulator relative to at least one threshold voltage, wherein adjusting the output voltage comprises:

one of adding and subtracting a predetermined increment to a digital representation of the output voltage based on at least one threshold voltage to generate an adjusted output signal;

converting the adjusted output signal to analog; and setting the output voltage substantially equal to the adjusted output signal.

10. The method of claim 9, wherein adjusting the output voltage comprises increasing the output voltage by a predetermined increment upon the at least one voltage across the respective at least one current regulator being less than a minimum threshold voltage.

11. The method of claim 9, wherein adjusting the output voltage comprises decreasing the output voltage by a predetermined increment upon each of the at least one voltage across the associated at least one current regulator being greater than a maximum threshold voltage.

12. The method of claim 9, further comprising controlling a brightness of the at least one LED string based on at least one of a duty-cycle of an enable signal and a predetermined interval.

13. The method of claim 12, wherein periodically sampling the voltage across each of the at least one current regulator comprises periodically sampling the at least one voltage across each of the respective at least one current regulator during an on time of the enable signal.

14. A power regulator system comprising:

means for generating an output voltage to provide power for illuminating at least one series connected light emitted diode (LED) string;

at least one means for regulating a substantially constant current flow through each of the respective at least one series connected LED string;

means for periodically sampling voltage associated with powering a respective at least one means for regulating the substantially constant current flow; and means for adjusting the output voltage based on a comparison of the sampled voltages with at least one threshold voltage, wherein the means for adjusting comprises a voltage monitor means, a digital-to-analog converter means (DAC), and an error amplifier means, the means for adjusting being configured to one of increase and decrease a reference voltage by a predetermined increment, the DAC being configured to convert the reference voltage to an analog reference voltage, and the error amplifier means being configured to compare the analog reference voltage with the output voltage and to output a command signal, such that the command signal is being configured as an error voltage for adjusting the output voltage of the output voltage generating means.

15. The system of claim 14, wherein the means for adjusting comprises means for comparing each of the sampled voltages with a maximum threshold voltage and a minimum threshold voltage.

16. The system of claim 15, wherein the means for adjusting the output voltage comprises means for increasing the output voltage upon at least one of the sampled voltage being less than the minimum threshold voltage and means for decreasing the output voltage upon each of the sampled voltages being greater than the maximum threshold voltage.

17. The system of claim 14, further comprising means for controlling a brightness of the respective at least one series connected LED string based on a duty-cycle of an enable signal, and wherein the means for periodically sampling voltage samples the voltage during at least one of an on-time of the enable signal and a predetermined interval.

* * * * *